US012158263B2

(12) United States Patent
Reddy et al.

(10) Patent No.: US 12,158,263 B2
(45) Date of Patent: Dec. 3, 2024

(54) DE-ICING LIGHT SYSTEMS, ASSEMBLIES, AND METHODS FOR AIRCRAFTS

(71) Applicant: GOODRICH CORPORATION, Charlotte, NC (US)

(72) Inventors: Chana Kesava Reddy, Bengaluru (IN); Sreekanth Koti Ananda Rao, Bangalore (IN); Ashish Kumar Agarwal, Bangalore (IN); Petchi Subramanian, Bangalore (IN)

(73) Assignee: GOODRICH LIGHTING SYSTEMS, INC., Phoenix, AZ (US)

( * ) Notice: Subject to any disclaimer, the term of this patent is extended or adjusted under 35 U.S.C. 154(b) by 51 days.

(21) Appl. No.: 17/850,644

(22) Filed: Jun. 27, 2022

(65) Prior Publication Data
US 2023/0258324 A1    Aug. 17, 2023

(30) Foreign Application Priority Data

Feb. 17, 2022  (IN) .............................. 202241008408

(51) Int. Cl.
| | |
|---|---|
| *F21V 29/90* | (2015.01) |
| *B64D 47/04* | (2006.01) |
| *B64D 47/06* | (2006.01) |
| *F21S 45/60* | (2018.01) |
| *F21V 5/04* | (2006.01) |
| *F21W 107/30* | (2018.01) |

(52) U.S. Cl.
CPC .............. *F21V 29/90* (2015.01); *B64D 47/04* (2013.01); *B64D 47/06* (2013.01); *F21S 45/60* (2018.01); *F21V 5/04* (2013.01); *F21W 2107/30* (2018.01)

(58) Field of Classification Search
CPC .......... F21V 29/90; F21V 5/04; B64D 47/04; B64D 47/06; F21W 2107/30
See application file for complete search history.

(56) References Cited

U.S. PATENT DOCUMENTS

| 6,870,139 B2* | 3/2005 | Petrenko ................. H05B 3/84 219/202 |
| 2004/0149734 A1* | 8/2004 | Petrenko ................. H05B 3/84 219/538 |

(Continued)

FOREIGN PATENT DOCUMENTS

| CN | 205907187 | | 1/2017 |
| CN | 205907187 U | * | 1/2017 |

(Continued)

OTHER PUBLICATIONS

Liu et al., A electric heating film for airplane windshield glass is anti-icing antifog, CN205907187U, , 2017, https://patents.google.com/patent/CN205907187U/en?oq=cn+205907187 (Year: 2017).*

(Continued)

*Primary Examiner* — Tracie Y Green
*Assistant Examiner* — Michael Chiang
(74) *Attorney, Agent, or Firm* — SNELL & WILMER L.L.P.

(57) ABSTRACT

A de-icing light assembly may comprise: a housing; a plurality of lights coupled to the housing; a lens assembly coupled to the housing, the lens assembly comprising: a lens material; an indium tin oxide (ITO) film disposed on the lens material; and a silicon oxide coating disposed on the ITO film.

12 Claims, 6 Drawing Sheets

(56) References Cited

U.S. PATENT DOCUMENTS

| | | | |
|---|---|---|---|
| 2012/0234816 A1* | 9/2012 | Petrenko | H05B 3/84 |
| | | | 219/203 |
| 2013/0249375 A1* | 9/2013 | Panagotacos | F21V 5/007 |
| | | | 313/15 |

FOREIGN PATENT DOCUMENTS

| | | |
|---|---|---|
| JP | 2016197513 | 11/2016 |
| JP | 6813076 | 1/2021 |

OTHER PUBLICATIONS

European Patent Office, European Partial Search Report dated Jun. 22, 2023 in Application No. 23154053.5.

European Patent Office, European Search Report dated Sep. 25, 2023 in Application No. 23154053.5.

* cited by examiner

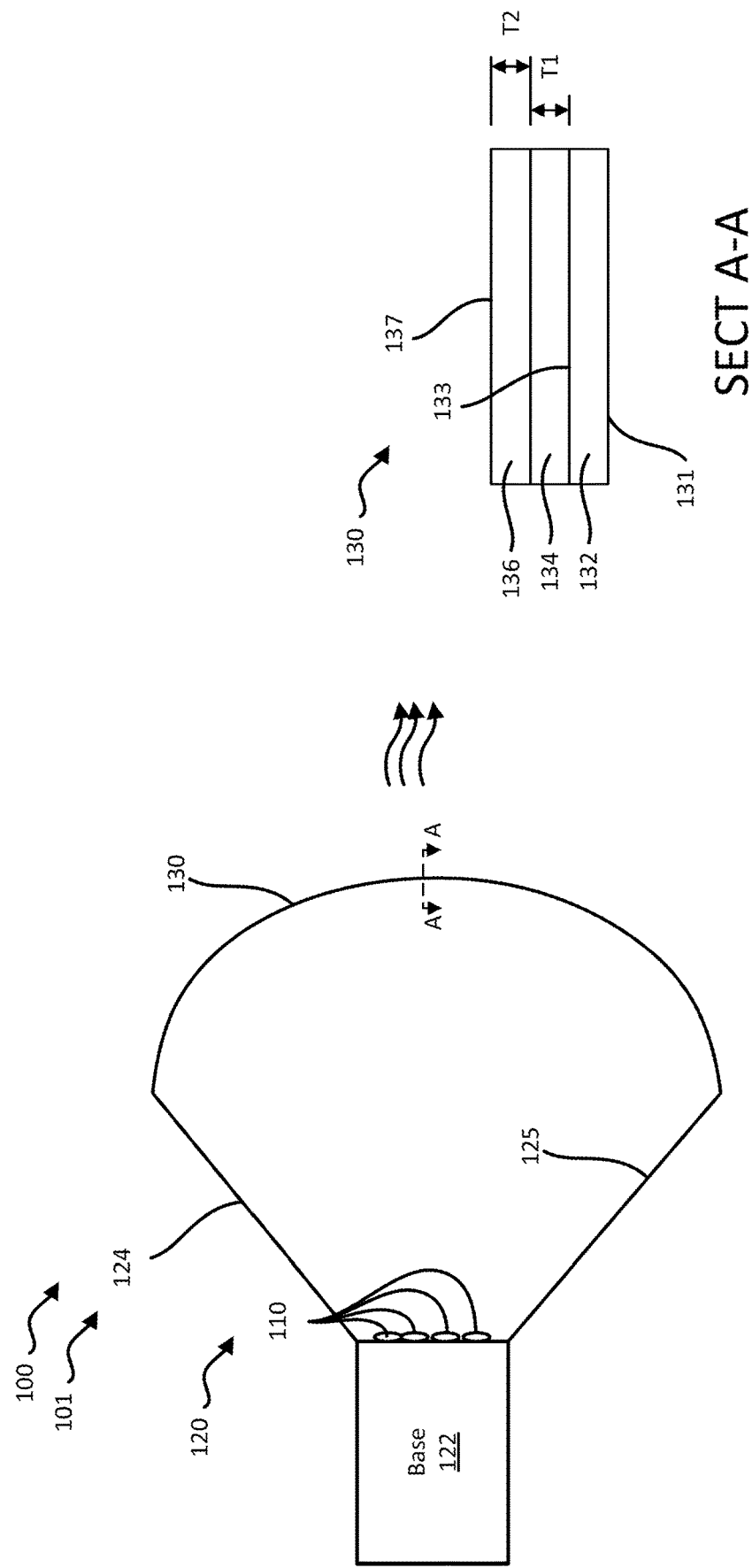

DE-ICING LIGHT SYSTEMS, ASSEMBLIES, AND METHODS FOR AIRCRAFTS

CROSS-REFERENCE TO RELATED APPLICATIONS

This application claims priority to, and the benefit of, India Patent Application No. 202241008408, filed Feb. 17, 2022 (DAS Code 4C0B) and titled "DE-ICING LIGHT SYSTEMS, ASSEMBLIES, AND METHODS FOR AIRCRAFTS," which is incorporated by reference herein in its entirety for all purposes.

FIELD

The present disclosure relates to aircraft lighting systems, and, more specifically, to de-icing light assembly and system for an aircraft.

BACKGROUND

Aircraft often have one or more light assemblies configured to allow a pilot to see a landing area, to allow a pilot to see during taxi, or the like. Aircrafts equipped with light emitting diodes ("LEDs") may experience icing on a lens of the light assembly. In this regard a pilot may experience reduced light output and/or visibility due to ice accruing on a lens of a light assembly.

SUMMARY

A de-icing light assembly is disclosed herein. The de-icing light assembly may comprise: a housing; a plurality of lights coupled to the housing; a lens assembly coupled to the housing, the lens assembly comprising: a lens material; an indium tin oxide (ITO) film disposed on the lens material; and a silicon oxide coating disposed on the ITO film.

In various embodiments, the de-icing light assembly further comprises a controller and a power source, the controller configured to electrically couple the power source to the ITO film. The controller may be configured to generate an electrical pulse across the ITO film. The electrical pulse may be generated in response to alternating an electrical switch between a closed position and an open position, the closed position creating an electrical circuit from a positive terminal of the power source through the ITO film to a negative terminal of the power source. In various embodiments, heat is generated in response to the electrical pulse across the ITO film. The controller may be configured to receive a de-icing command from a main controller of an aircraft.

In various embodiments, the housing comprises a base coupled to the plurality of lights and a body extending from the base to the lens assembly.

A de-icing light system for an aircraft is disclosed herein. The de-icing light system may comprise: a power source; a plurality of lights; a lens assembly comprising an indium tin oxide (ITO) film, the plurality of lights configured to transmit light through the lens assembly; and a controller in electrical communication with the power source, the plurality of lights, and the ITO film, the controller configured to: receive a de-icing command; and command electrical stimulation of the ITO film in response to receiving the de-icing command.

In various embodiments, the controller is further configured to generate an electrical pulse of current across the lens assembly in response to the command. The electrical pulse of current may be generated in response to electrically coupling and decoupling the power source to the ITO film. Heat between ice on an external surface of the lens assembly and a lens material of the lens assembly may be generated in response to the electrical pulse of current. The ice melts in response to the heat.

In various embodiments, a transmittance of the de-icing light assembly is between 85% and 100%.

In various embodiments, the lens assembly further comprises a silicon oxide coating disposed on the ITO film.

An aircraft is disclosed herein. The aircraft may comprise: a fuselage; a wing extending from the fuselage; and a de-icing light assembly disposed on at least one of the fuselage or the wing, the de-icing light assembly, the de-icing light assembly comprising a lens assembly configured to receive an electrical pulse during a de-icing process.

In various embodiments, the lens assembly comprises a lens material, an indium tin oxide (ITO) film, and a silicon oxide coating. In various embodiments, the ITO film is disposed between the lens material and the silicon oxide coating. The aircraft may further comprise a power source configured to be electrically coupled to the ITO film during the de-icing process. The power source may be configured to be electrically coupled and electrically de-coupled from the ITO film during the de-icing process.

In various embodiments, a transmittance of the lens assembly is between 85% and 100% for an average wavelength of light emitted from a plurality of lights of the de-icing light assembly.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A illustrates a cross-sectional view of a light assembly, in accordance with various embodiments;

FIG. 3B illustrates a cross-sectional view of a lens assembly, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein refers to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. As used herein, "forward" refers to the direction associated with a nose (e.g., the front end) of the aircraft, or generally, to the direction of flight or motion.

Figure 1:
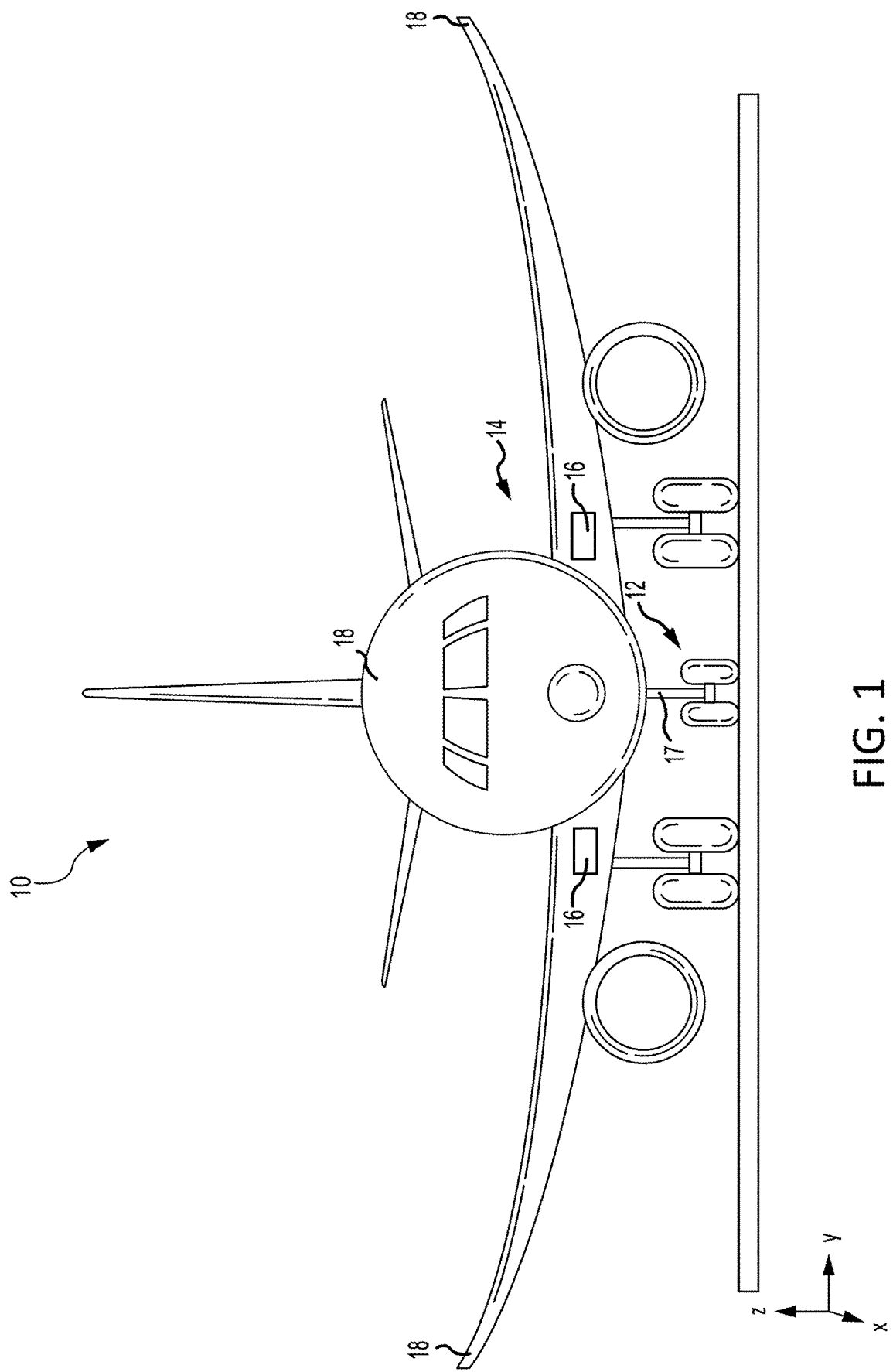
FIG. 1 illustrates an aircraft, in accordance with various embodiments.

With reference to FIG. 1, an aircraft 10 in accordance with various embodiments may comprise aircraft systems, for example, one or more landing gear such as landing gear 12, which may generally support aircraft 10 when aircraft is not flying, allowing aircraft 10 to taxi, take off, and land without damage. Aircraft 10 may include one or more exterior lamps 14 such as, for example, landing lights 16, taxi lights 17, and navigation lights 18. Aircraft 10 may include any number of other exterior lamps 14 such as logo lights, runway turnoff lights, engine scan lights, anti-collision lights, strobe lights, beacon lights, cargo compartment lights, obstruction lights, landing gear lights, and/or the like.

Figure 2:
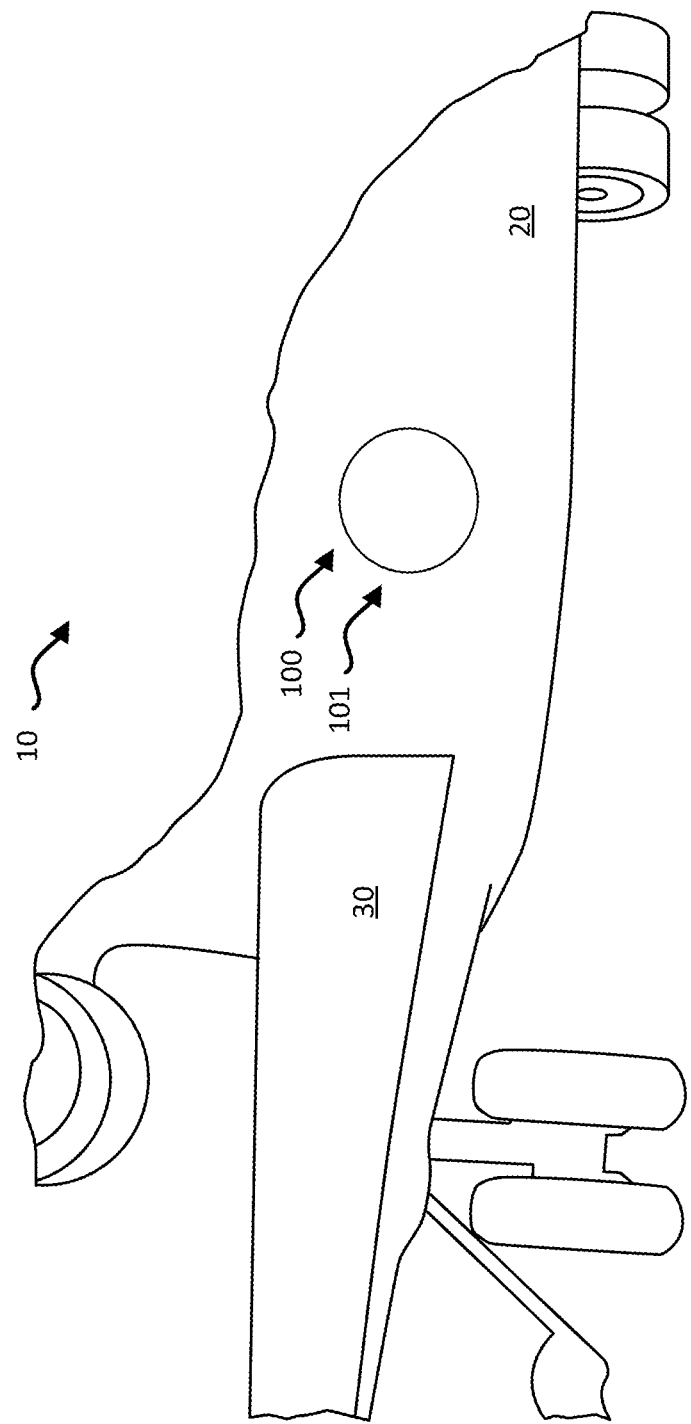
FIG. 2 illustrates an aircraft light assembly, in accordance with various embodiments.

With reference now to FIG. 2, a perspective view of a portion of aircraft 10, in accordance with various embodiments, is illustrated. Aircraft 10 may include a de-icing light assembly 100 disposed on fuselage 20 proximate a wing 30. Although illustrated at fuselage 20 proximate wing 30, the de-icing light assembly 100 may be disposed in any location on aircraft 10 (e.g., exterior lamps 14 locations from FIG. 1). The de-icing light assembly 100 comprises a de-icing light system 101 as described further herein. In various embodiments, the de-icing light system 101 is configured for fast and efficient melting and/or removal of ice relative to typical light de-icing systems. In various embodiments, the de-icing light system 101 may be configured for on-demand use by a pilot or the like.

Referring now to FIG. 3A, a cross-sectional view of a de-icing light assembly 100 with a de-icing light system 101 is illustrated, in accordance with various embodiments. In various embodiments, the de-icing light assembly 100 comprises a plurality of light sources 110, a light housing 120, and a lens assembly 130. In various embodiment, each light source in the plurality of light sources 110 may comprise an incandescent bulb, a light emitting diodes ("LED"), or the like. The light housing 120 comprises a base 122 and a body 124. In various embodiments, the base 122 is configured to secure/hold the plurality of light sources 110. In various embodiments, the base 122 is configured to house a controller (e.g., controller 202 from FIG. 5), a power source (e.g., power source 206 from FIG. 5), and/or any other electrical components of de-icing light assembly 100 (e.g., memory 204 from FIG. 5).

In various embodiments, the body 124 may comprise a reflector 125 on an internal surface. In this regard, the reflector 125 may be configured to reflect light from the plurality of light sources 110 out the lens assembly 130. In various embodiments the body 124 increases in cross-sectional area as the body 124 extends axially way from the base 122. Although illustrated as comprising a taper, the present disclosure is not limited in this regard. For example, the body 124 may be elliptical, dome shaped, or the like and still be within the scope of this disclosure.

In various embodiments, the lens assembly 130 is disposed distal to the base 122 and coupled to the body 124. The lens assembly 130 may be a convex lens, a biconvex lens, or any other type of lens utilized in light assemblies. The present disclosure is not limited in this regard.

Referring now to FIG. 3B, a cross-sectional view of the lens assembly 130 is illustrated in accordance with various embodiments. The lens assembly 130 comprises a lens material 132, an indium tin oxide (ITO) film 134, and a silicon dioxide ($SiO_2$) coating 136. The lens material 132 may comprise glass, a glass composite, or a polymeric material. In various embodiments, the lens comprises glass.

In various embodiments, the ITO film 134 is disposed between the lens material 132 and the $SiO_2$ coating 136. In various embodiments, the lens material 132 and the $SiO_2$ coating are made of the same material. In various embodiments, the lens material 132 and the $SiO_2$ coating are made of different materials. The present disclosure is not limited in this regard. The lens material 132 comprises an internal surface 131 oriented toward (e.g., via a concave surface) toward the plurality of light sources 110 from FIG. 3A. The $SiO_2$ coating 136 comprises an external surface 137 (e.g., a convex surface) that interfaces with an external environment. In various embodiments, the $SiO_2$ coating 136 is configured to increase a transmittance through the lens assembly 130 as described further herein. In various embodiments, the ITO film 134 is configured to receive an electric pulse as described further herein.

In various embodiments, the ITO film 134 comprises a thickness T1 of approximately 100 nm, and the $SiO_2$ coating 136 comprises a thickness T2 of between 70 and 90 nm. However, the present disclosure is not limited in this regard, and one skilled in the art may recognize various thicknesses that balance transmittance of the lens assembly 130 with a rate of de-icing, in accordance with various embodiments. In various embodiments, the $SiO_2$ coating 136 may increase a transmittance of the lens assembly 130 by at least 10% relative to a lens assembly having the ITO film 134 and the lens material 132 without the $SiO_2$ coating. In this regard, conductive and thermal benefits of the ITO film 134 may be utilized for de-icing of the lens assembly 130 while maintaining a sufficient transmittance of the lens assembly 130, in accordance with various embodiments.

Figure 3C:
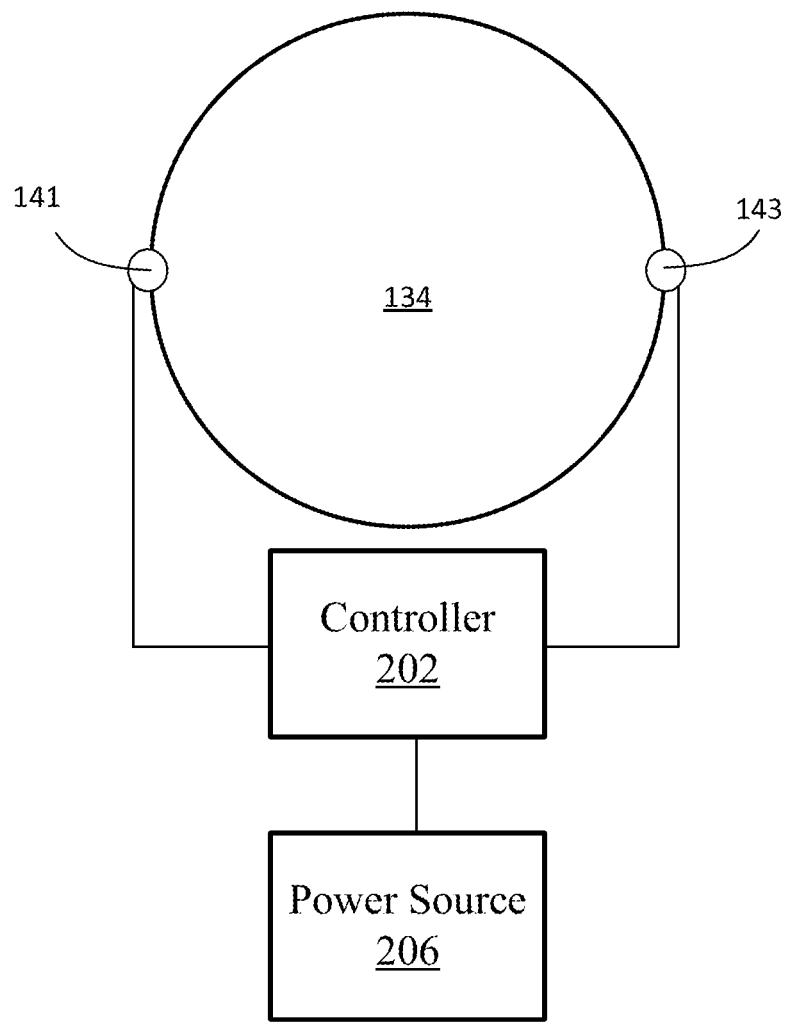
FIG. 3C illustrates a schematic view of a portion of a de-icing system, in accordance with various embodiments.

Referring now to FIG. 3C, a portion of the de-icing light system 101 of the de-icing light assembly 100 is illustrated, in accordance with various embodiments. In various embodiments, the de-icing light assembly 100 further comprises a positive electrical lead 141 and a negative electrical lead 143. The positive electrical lead 141 and the negative electrical lead 143 may both be coupled to the ITO film 134.

In various embodiments, the positive electrical lead 141 is disposed opposite (e.g., across a surface) of the ITO film 134. In various embodiments, during operation of the de-icing light system 101, a positive terminal of a power source 206 is electrically coupled to the positive lead and a negative terminal of the power source 206 is electrically coupled to the negative lead, creating an electrical circuit through the ITO film 134. In various embodiment an electric source for the de-icing light assembly may comprise a direct current (DC) source or an alternating current (AC) source. The present disclosure is not limited in this regard. In various embodiments, in order to generate an electrical pulse, an electrical switch between the power source 206 and one of the electrical leads 141, 143 may be commanded (e.g., via the controller 202) to open and close. In this regard, the de-icing light system 101 is configured to electrically stimulate the ITO film 134 by generating a pulse configured to produce heat between an external surface 133 of the lens material 132 from FIG. 3B and ice disposed on the external surface 133 of the $SiO_2$ coating 136.

In various embodiments, a transmittance of the lens assembly 130 is between 85% and 100% for an average wavelength of the plurality of light sources 110, or between 90% and 100% for an average wavelength of the plurality of light sources 110.

Figure 4:
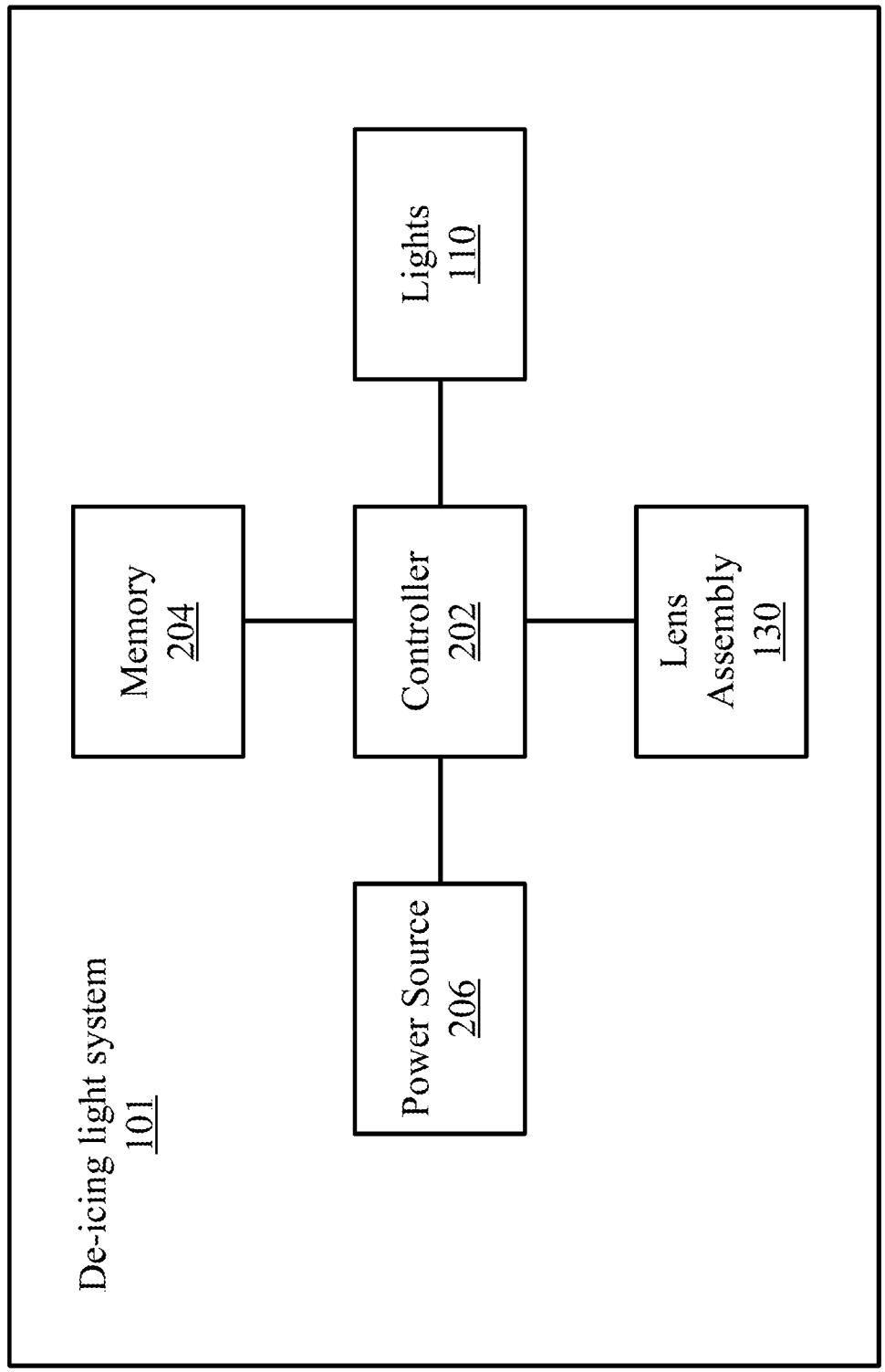
FIG. 4 illustrates a schematic view of a de-icing system, in accordance with various embodiments.

Referring now to FIG. 4, a schematic view of the de-icing light system 101 from FIGS. 2 and 3A-3C is illustrated, in accordance with various embodiments. The de-icing light system 101 comprises the controller 202, the power source 206, a memory 204, the plurality of light sources 110, and the lens assembly. In various embodiments, the controller 202 is electrically coupled to the power source 206, the memory 204, the light sources 110, and the lens assembly 130. In various embodiments, the controller 202 is configured to electrically couple the power source to the lens assembly 130 (e.g., the ITO film 134) during a de-icing process, as described previously herein.

The controller 202 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 202 may utilize one or more processors of any appropriate type/configuration, may utilize any appropriate processing architecture, or both). In various embodiments, the controller 202 may further include any non-transitory memory known in the art. The memory 204 may store instructions usable by the logic device to perform operations. Any appropriate computer-readable type/configuration may be utilized as the memory 204, any appropriate data storage architecture may be utilized by the memory 204, or both.

The memory 204 may be integral to the de-icing light system 101 or may be located remote from the de-icing light system 101. The controller 202 may communicate with the memory 204 via any wired or wireless protocol. In that regard, the controller 202 may access data stored in the memory 204. In various embodiments, the controller 202 may be integrated into computer systems onboard an aircraft. Furthermore, any number of conventional techniques for electronics configuration, signal processing and/or control, data processing and the like may be employed. Also, the processes, functions, and instructions may include software routines in conjunction with processors, etc.

System program instructions and/or controller instructions may be loaded onto a non-transitory, tangible computer-readable medium having instructions stored thereon that, in response to execution by the processor, cause the controller 202 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In Re Nuijten to fall outside the scope of patentable subject matter under 35 U.S.C. § 101.

In various embodiments, the controller 202 is in electrical communication with a main controller on-board an aircraft. In this regard, the controller 202 may receive a command to initiate a de-icing process in accordance with process 500 from FIG. 5.

Figure 5:
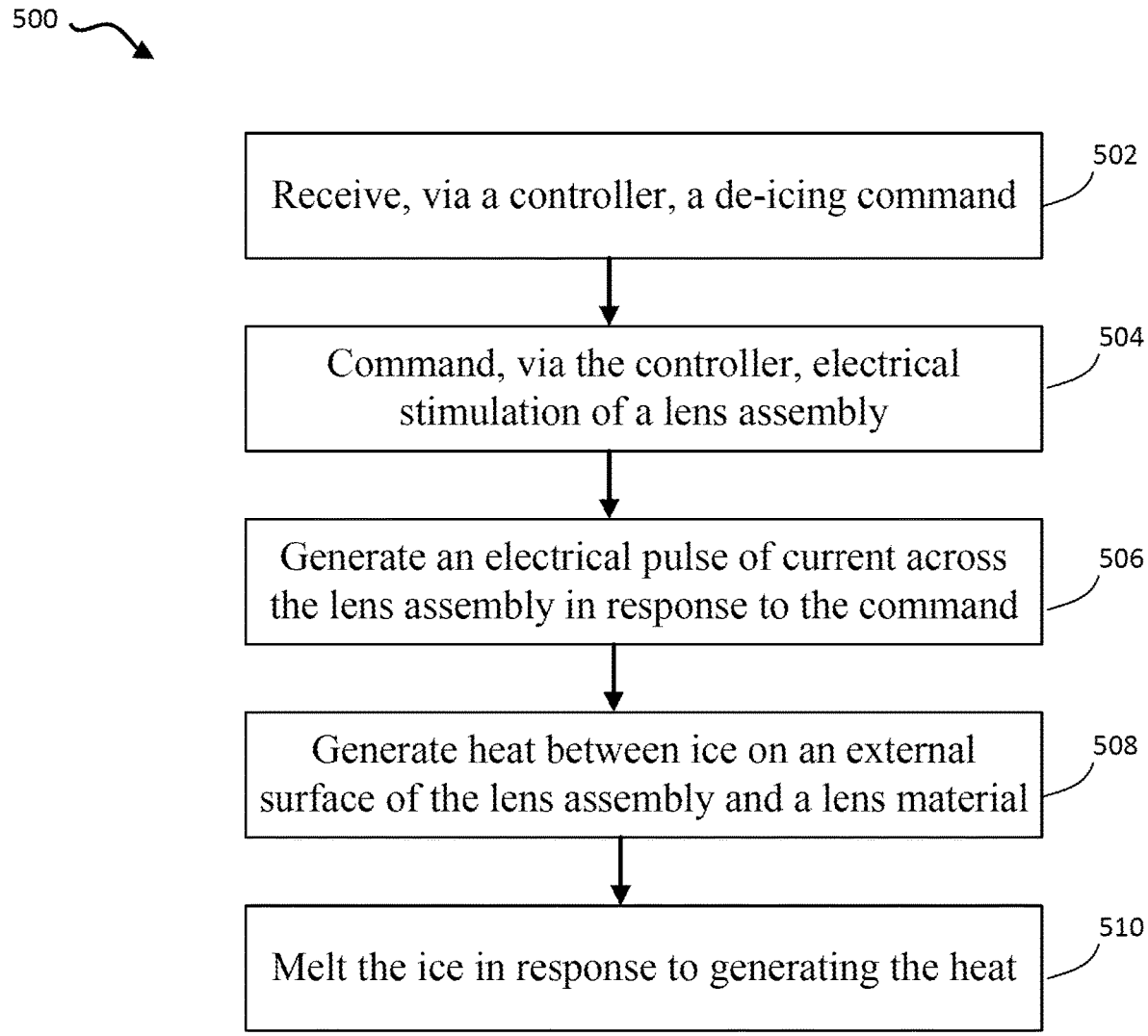
FIG. 5 illustrates a process for operating a de-icing system, in accordance with various embodiments.

Referring now to FIG. 5, the de-icing process 500 of the de-icing light system 101 from FIGS. 2, 3A-C, and 4 is illustrated, in accordance with various embodiments. In various embodiments, the process 500 comprises receiving, via a controller 202, a e-icing command (step 502). The de-icing command may be received from a main controller on-board an aircraft and/or may be initiated by a pilot.

The process 500 further comprises commanding, via the controller 202, electrical stimulation of the lens assembly (step 504). In this regard, the controller 202 may command an electrical switch to alternate between a closed position and an open position, in accordance with various embodiments. In response to being in a closed position, an electrical circuit may be created from a positive terminal of a power source 206 through an ITO film 134 of the lens assembly 130 to a negative terminal of the power source 206. By alternating between the open position and the closed position, the controller 202 may generate an electrical pulse of current across the lens assembly in response to the command (step 506).

The process 500 further comprises generating heat between a layer of ice on an external surface 137 of the lens assembly 130 and a lens material 132 (step 508). The process 500 further comprises melting the layer of ice on the external surface 137 in response to generating the heat (step 510).

In various embodiments, the power source 206 may be relatively low power (e.g., 10 mW). In various embodiments, heat fluxes at the ice-solid interface may be configured for a $q''_{in}$ between 10 W/cm$^2$ and 100 W/cm$^2$, or between 10 W/cm$^2$ and 75 W/cm$^2$. The present disclosure is not limited in this regard. The lower the temperature, the greater the heat fluxes for spontaneous pulse-defrosting, in accordance with various embodiments.

In various embodiments, the process 500 may facilitate de-icing of de-icing light assembly 100 from FIGS. 2, 3A-C, and 4 in minutes, or less than a minute relative to approximately twenty minutes or more in typical light assemblies for aircrafts. In various embodiments, the de-icing light assembly 100 from FIGS. 2, 3A-C, and 4 may maintain sufficient transmittance of the de-icing light assembly 100 by use of the $SiO_2$ coating.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A de-icing light assembly, comprising:
   a housing comprising a base and a body, the body comprising a reflector on an internal surface, the body increasing in cross-sectional area as the body extends axially away from the base;
   a plurality of lights coupled to the housing, the base configured to secure the plurality of lights;
   a lens assembly that is disposed distal to the base and coupled to the body of the housing, the reflector configured to reflect light from the plurality of lights out the lens assembly the lens assembly consisting of:
   a lens material;
   an indium tin oxide (ITO) film disposed on the lens material; and
   a silicon oxide coating disposed on the ITO film.

2. The de-icing light assembly of claim 1, further comprising a controller and a power source, the controller configured to electrically couple the power source to the ITO film.

3. The de-icing light assembly of claim 2, wherein the controller is configured to generate an electrical pulse across the ITO film.

4. The de-icing light assembly of claim 3, wherein the electrical pulse is generated in response to alternating an electrical switch between a closed position and an open position, the closed position creating an electrical circuit from a positive terminal of the power source through the ITO film to a negative terminal of the power source.

5. The de-icing light assembly of claim 3, wherein heat is generated in response to the electrical pulse across the ITO film.

6. The de-icing light assembly of claim 2, wherein the controller is configured to receive a de-icing command from a main controller of an aircraft.

7. An aircraft, comprising:
   a fuselage;
   a wing extending from the fuselage; and
   the de-icing light assembly of claim 1 disposed on at least one of the fuselage or the wing.

8. A de-icing light system for an aircraft, the de-icing light system, comprising:
   a power source;
   a plurality of lights;
   a lens assembly consisting of a lens material, an indium tin oxide (ITO) film disposed on the lens material, and a silicon oxide coating disposed on the ITO film, the plurality of lights configured to transmit light through the lens assembly, wherein a transmittance of the lens assembly is between 85% and 100%; and
   a controller in electrical communication with the power source, the plurality of lights, and the ITO film, the controller configured to:
   receive a de-icing command; and
   command electrical stimulation of the ITO film in response to receiving the de-icing command.

9. The de-icing light system of claim 8, wherein the controller is further configured to generate an electrical pulse of current across the lens assembly in response to the command.

10. The de-icing light system of claim 9, wherein the electrical pulse of current is generated in response to electrically coupling and decoupling the power source to the ITO film.

11. The de-icing light system of claim 9, wherein heat between ice on an external surface of the lens assembly and the lens material of the lens assembly is generated in response to the electrical pulse of current.

12. The de-icing light system of claim 11, wherein the ice melts in response to the heat.

* * * * *